United States Patent [19]

Svensson

[11] Patent Number: 4,765,675

[45] Date of Patent: Aug. 23, 1988

[54] DISPLACEABLE SUN VISOR FOR AUTOMOTIVE VEHICLES

[75] Inventor: E. Gunnar Svensson, Malung, Sweden

[73] Assignee: Autopart Sweden AB, Malung, Switzerland

[21] Appl. No.: 40,158

[22] Filed: Apr. 20, 1987

[30] Foreign Application Priority Data

Apr. 25, 1986 [SE] Sweden .................................. 8601937

[51] Int. Cl.$^4$ ............................................... B60J 3/02
[52] U.S. Cl. .................... 296/97 G; 296/97 K
[58] Field of Search .................. 296/97 G, 97 K, 97 R

[56] References Cited

U.S. PATENT DOCUMENTS

| 1,258,107 | 3/1918 | Geist | 296/97 R |
|---|---|---|---|
| 1,854,892 | 4/1932 | Ewend | 296/97 R |
| 1,931,438 | 10/1933 | Hitz | 296/97 G |
| 1,941,032 | 12/1933 | Knowles | 296/97 G |
| 2,477,680 | 8/1949 | Young | 296/97 K |
| 3,226,151 | 12/1965 | Reuther | 296/97 R |

FOREIGN PATENT DOCUMENTS

| 0036796 | 9/1981 | European Pat. Off. |
|---|---|---|
| 2635535 | 3/1977 | Fed. Rep. of Germany |
| 247781 | 2/1926 | United Kingdom |
| 254167 | 7/1926 | United Kingdom |
| 308014 | 3/1929 | United Kingdom |
| 335720 | 10/1930 | United Kingdom |
| 929667 | 6/1963 | United Kingdom |

Primary Examiner—Robert R. Song
Attorney, Agent, or Firm—Young & Thompson

[57] ABSTRACT

A sun visor is supported by a vertically displaceable device which is in driving co-action with a displacing mechanism operated by an electric motor. The displacing mechanism and the electric drive motor are arranged in a corner pillar of the vehicle. Torsion springs urge the visor body against the window and/or ceiling of the vehicle. The inventive assembly increases the effective useful range of the sun visor.

3 Claims, 3 Drawing Sheets

DISPLACEABLE SUN VISOR FOR AUTOMOTIVE VEHICLES

The present invention relates to a displaceable sun visor for automotive vehicles.

Conventional sun visors, or glare shields, for automotive vehicles are normally pivotably mounted on a horizontal pivot axle which, in turn, is pivotably mounted on a vertical pivot axle. Although such sun visors function quite well in the main, there are times when they are less satisfactory. For example, the sun visor may, at times, be too high for a person of short stature, unless the vehicle seat is commensurately high, while when the vehicle seat is low the sun visor will be too high even for people of average body height, meaning that such people are forced to stretch up from their normal driving position in order to benefit from the visor.

The object of the invention is to remove these drawbacks.

This object is achieved in accordance with the invention with a sun visor that has the characterizing features set forth in the following claim 1.

So that the invention will be more readily understood, an exemplifying embodiment of the invention will now be described in detail with reference to the accompanying drawings, in which FIG. 1 is a rear view, partly in section, of an inventive sun visor assembly mounted on a corner pillar of an automotive vehicle;

As shown in the Figures, a screw 1 is journalled in corner pillar 2 of an automotive vehicle. The upper end of the screw 1 is journalled for rotation in the pillar in some convenient manner and the lower end of the screw is connected, via a transmission, to the output shaft of a reversible electric motor M. A nut 3, which is held against rotation, is arranged for upward or downward movement along the vertical extension of the pillar 2, in response to rotation of the motor $M_2$ and in dependence on the direction of rotation thereof.

Figure 3:
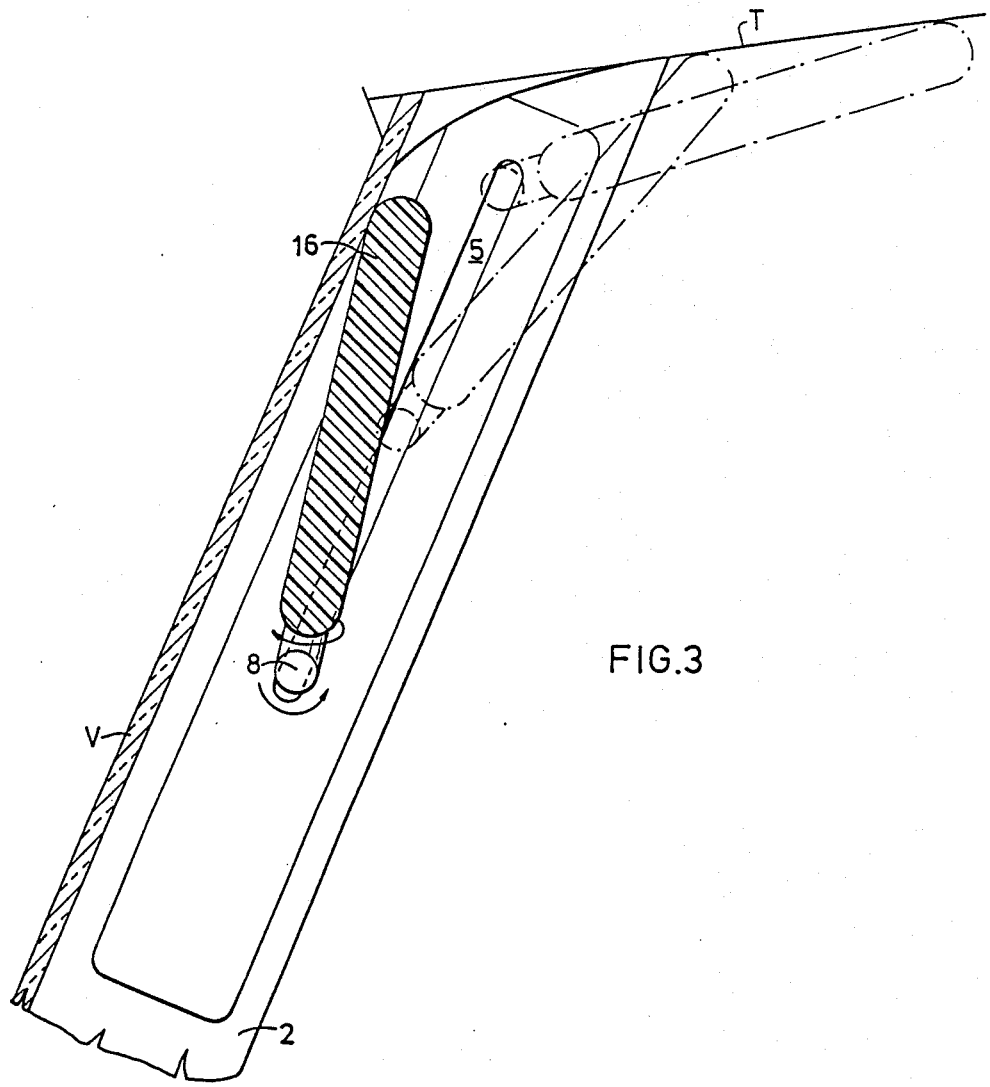
FIG. 3 is a side view of the sun visor assembly of FIG. 1, illustrating in chain lines the various positions to which the sun visor can be displaced.

The nut 3 has provided on the surface thereof facing the vehicle interior a shaft 4 which extends outwardly through a slot 5 in the corner pillar 2 (FIG. 3). Located centrally at the outer end of the shaft 4 is an indent or recess 6 in which one end of a torsion spring 7 is seated. The other end of the torsion spring 7 is inserted in a recess provided in a sleeve 8 which surrounds the shaft 4 and which is rotatably journalled on first a hollow shaft journal or trunnion 9 arranged around the inner end of the shaft 4 adjacent the pillar and secondly on the outer end of the shaft 4 by means of an internal annular projection 10, which also co-acts with catches 11 on the outermost end of the shaft in a manner to hold the sleeve 8 axially in place.

Extending outwardly from the peripheral surface of the sleeve 8, perpendicular to the longitudinal axis thereof, is a shaft 12 which carries for rotation a second sleeve 13 and a second torsion spring 14. The shaft 12, the second sleeve 13, and the torsion spring 14 are constructed in the same manner as the first mentioned shaft 4, the sleeve 8, and the torsion spring 7, and function in the same manner as these components. As will be seen from the Figures, the springs 7, 14 are pre-tensioned so that the sleeves 8, 13 endeavour to rotate in the arrowed directions indicated in the drawings.

The sun visor 16, which is firmly connected to the sleeve 13 through a push-on connecting device 15 which extends from the sleeve 13 at right angles to the longitudinal axis thereof, is thus urged by the action of the springs towards the windscreen V or the ceiling T of the vehicle, with the upper surface of the visor adjacent thereto.

Figure 1:
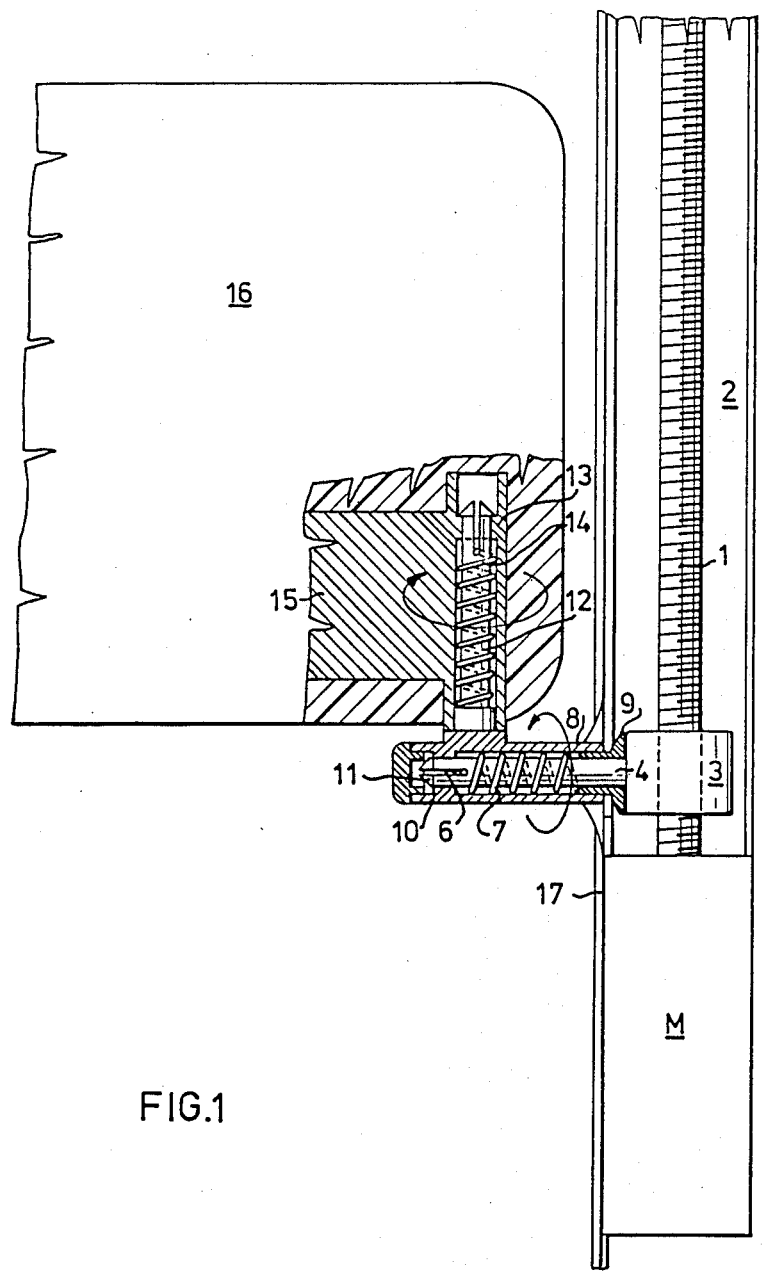
Figure 2:
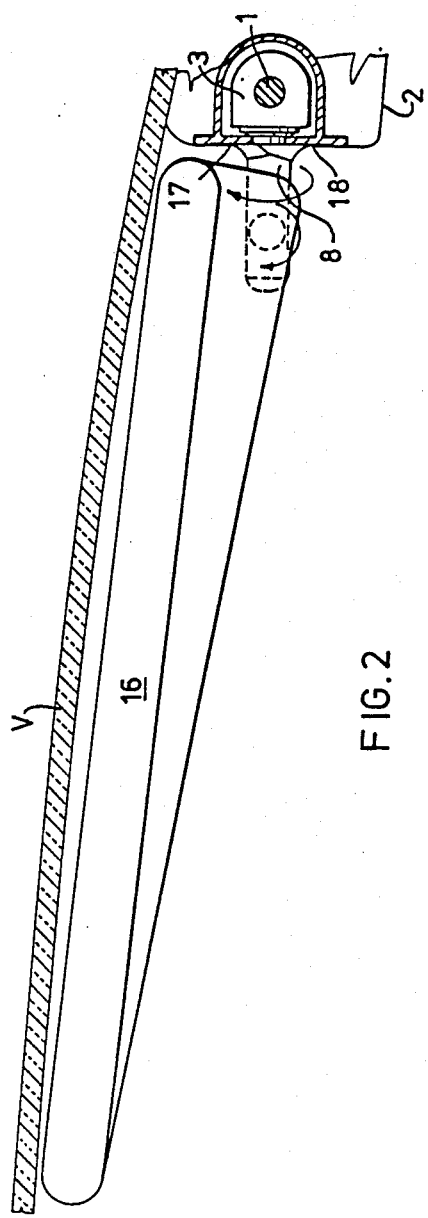
FIG. 2 illustrates the sun visor assembly of FIG. 1 from above.

As illustrated in FIGS. 1 and 2, the sun visor assembly also includes two mutually overlapping, elongated rubber plates 17, 18 which sealingly cover the slot 5 and surround the inner end of the sleeve 8.

The electric motor M is preferably operated by means of a switch provided on the instrument panel or dashboard, rotation of the motor M, and therewith the screw 1, causing the nut 3 to move up or down, depending on the selected direction of rotation of the screw 1. FIG. 3 illustrates in chain lines an upper rest position and an intermediate position of the sun visor, whereas the lower position of the visor is shown in full lines in FIGS. 1 and 2.

As a result of the inventive construction of the sun visor assembly, the sun visor can be readily moved from a rest position to a position of use. Furthermore, the vertical height of the sun visor above the vehicle floor can be varied to a much greater extent than in the case of conventionally journalled sun visors in which the vertical height of the lower edge of the visor is determined by the position to which the visor is swung about its horizontal pivot axle. Thus, the inventive sun visor can be adjusted so as to shield the eyes of the driver or a passenger against glare from the sum, irrespective of the angle of incidence of the sunrays. This increases the effective range of the sun visor.

Although the illustrated and exemplifying sun visor is operated by means of an electric drive motor, it will be understood that other types of motor can be used, e.g. hydraulic or pneumatic motors, depending on the power source available on the vehicle. The displacing mechanism can also be made manually operable, if desiring to be independent of an external power source.

Although the inventive sun visor assembly is primarily intended to be installed in front of the driving seat of a vehicle, it will be obvious that the sun visor assembly can be placed adjacent any window in the vehicle.

It will also be understood that the invention is not restricted to the illustrated exemplifying embodiment thereof, and that modifications can be made. For example, the displacement mechanism may have a form different to that described and illustrated and may, for example, comprise a rack and pinion arrangement, or an endless belt or chain. The displacement mechanism and the drive motor may also be journalled in a part of the vehicle other than the aforedescribed corner pillar, for instance in a separate beam capable of being attached to the vehicle chassis in some suitable manner.

Finally, in the case of a sun visor which extends across the full width of the windscreen, it is preferred to provide a displacement mechanism at each end of the sun visor and to drive said mechanisms synchronously with each other.

I claim:

1. A sun visor assembly for automotive vehicles, comprising a visor body, at least one vertically displaceable device supporting said visor body, a horizontal first pivot shaft and an essentially vertical second pivot shaft connecting said visor body to said displaceable device, and a respective torsion spring disposed in each of said first and second pivot shafts, so as to urge said visor body into abutment with the ceiling or windshield of a said vehicle, depending on the vertical position of the displaceable device.

2. Assembly according to claim 1, further comprising means for displacing said at least one vertically displaceable device, and a drive motor for driving said displacing means, said motor and said displacing means being adapted to be mounted in a corner pillar of a said vehicle.

3. Assembly according to claim 2, wherein said displacing means comprises a nut held against rotation and carrying said visor body, and a screw coacting with said nut and driven by said motor.

* * * * *